(12) United States Patent
Hashimoto et al.

(10) Patent No.: US 6,321,710 B1
(45) Date of Patent: Nov. 27, 2001

(54) DIFFUSION JOINING STRUCTURE

(75) Inventors: Tomoyuki Hashimoto; Kouji Ueda; Makoto Sato; Masakatsu Satoh; Kiyonobu Mizoue, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/629,795

(22) Filed: Jul. 31, 2000

(30) Foreign Application Priority Data

Aug. 6, 1999 (JP) .................................................. 11-223985
Aug. 6, 1999 (JP) .................................................. 11-223986

(51) Int. Cl.$^7$ ...................................................... F01L 3/02
(52) U.S. Cl. ..................................... 123/188.8; 123/188.11
(58) Field of Search ........................... 123/188.8, 188.11; 29/888.44

(56) References Cited

U.S. PATENT DOCUMENTS

| | | | |
|---|---|---|---|
| 5,586,530 | * 12/1996 | Adachi et al. | 123/188.8 |
| 5,687,685 | * 11/1997 | Amano et al. | 123/188.8 |
| 5,692,726 | * 12/1997 | Adachi et al. | 123/368 |
| 5,765,520 | * 6/1998 | Adachi et al. | 123/188.8 |
| 5,768,779 | * 6/1998 | Adachi et al. | 29/888.06 |
| 5,778,531 | * 7/1998 | Inami et al. | 29/888.06 |
| 5,787,853 | * 8/1998 | Adachi et al. | 123/193.5 |
| 5,803,037 | * 9/1998 | Kawamura et al. | 123/188.8 |
| 5,809,968 | * 9/1998 | Tsuchida | 123/432 |
| 5,848,579 | * 12/1998 | Adachi et al. | 123/188.8 |
| 5,860,401 | * 1/1999 | Adachi et al. | 123/188.8 |
| 6,138,351 | * 10/2000 | Adachi et al. | 29/888.44 |

FOREIGN PATENT DOCUMENTS

| | | | |
|---|---|---|---|
| 9-122924 | 5/1997 | (JP) | B23K/11/20 |
| 7-189628 | 7/1995 | (JP) | F01L/3/02 |
| 7-103070 | 4/1995 | (JP) | F02F/1/24 |

* cited by examiner

*Primary Examiner*—Willis R. Wolfe
*Assistant Examiner*—Hai Huynh
(74) *Attorney, Agent, or Firm*—Sughrue, Mion, Zinn, Macpeak & Seas, PLLC

(57) ABSTRACT

The external surface configuration of a portion of a mounted member that is joined to a mounting member includes, at a distal end position which first comes into contact with the mounting member when the mounted member is pressed against the mounting member, a curved surface bulged toward the mounting member. Other curved surfaces are bulged toward the mounting member with radii of curvatures larger than that of the curved surface and linking up with the curved surface.

8 Claims, 10 Drawing Sheets

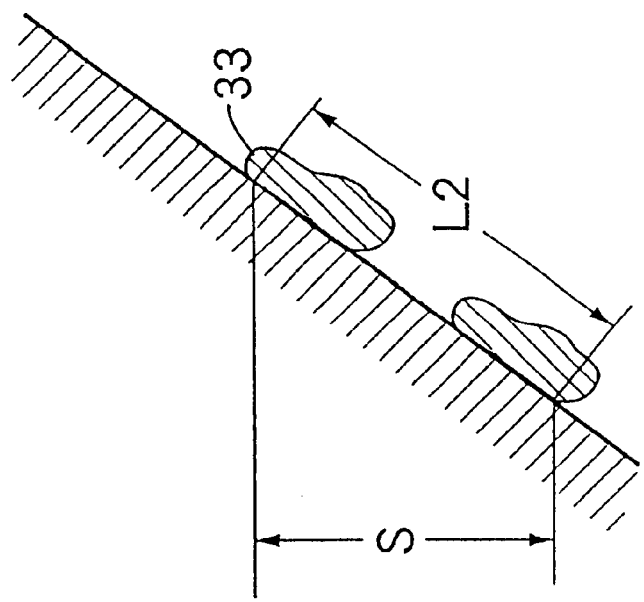
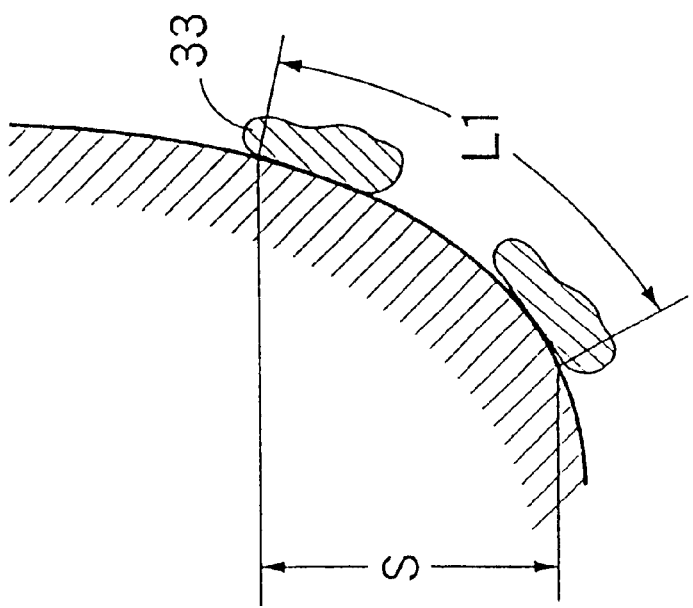

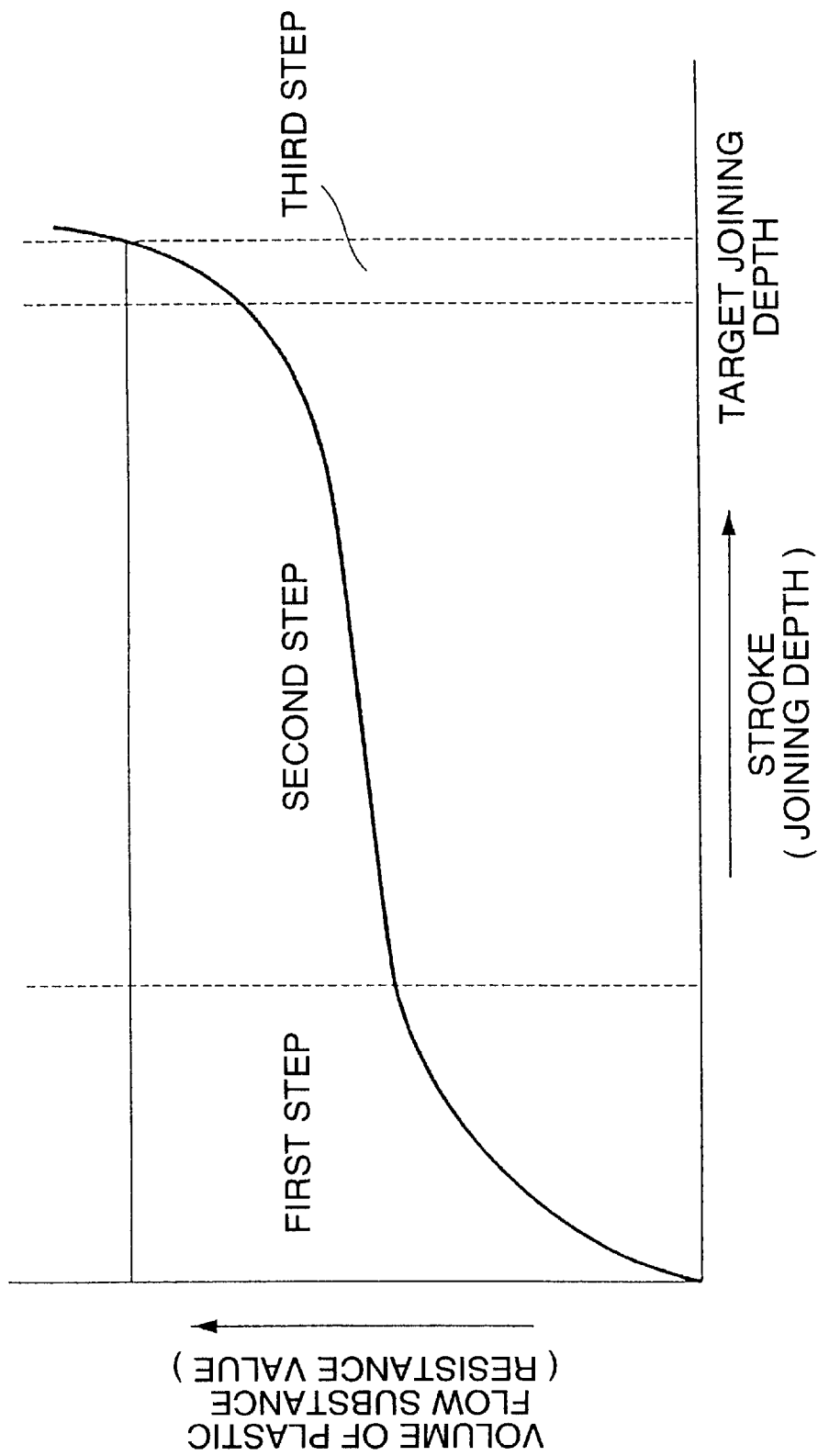

DIFFUSION JOINING STRUCTURE

BACKGROUND OF THE INVENTION

1. Field of the Invention

The present invention relates to a diffusion joining in which a mounted member is pressed against a mounting member while the mounted member and the mounting member are being heated.

2. Description of the Related Art

Diffusion joining structures as described above have already been known in JP-A-7-103070, JP-A-7-189628 and JP-A-9-122924, and the official gazettes of those unexamined patent publications disclose diffusion joining structures in which a valve seat as a mounted member is diffusion joined to a cylinder head as a mounting member, which valve seat is formed of a material different from that of the cylinder head.

In the conventional diffusion joining structures as described above, however, since the external face of a portion of the mounted member which is to be joined to the mounting member has a transverse cross-sectional configuration comprising a combination of straight lines in a state prior to joining, sufficient plastic flows are not generated at the straight line portions, and therefore a sufficient joining strength cannot be obtained. This seems to be because the plastic flow is generated sufficiently at the distal portion of the mounted member which is adapted to first be brought into contact with the mounting member when the mounted member is pressed to the mounting member since the distal portion is formed acutely to thereby generate a sufficient diffusion joining layer thereat, whereas no sufficient diffusion joining layer is formed at the portion having the straight transverse cross-sectional configuration and linking up with the distal end portion since the sliding speed and volume of the plastic flow substance are clearly reduced thereat when compared with the distal end portion.

SUMMARY OF THE INVENTION

The present invention was made in view of the above situations and an object thereof is to provide a diffusion joining structure for increasing the sliding speed and volume of a plastic flow substance generated between a mounted member and a mounting member when a diffusion joining takes place so as to obtain a sufficient joining strength.

With a view to attaining the aforesaid object, according to a first aspect of the invention, there is provided a diffusion joining structure in which a mounted member is pressed against a mounting member in a state that the mounted member and the mounting member are heated, wherein an external surface configuration prior to joining of a portion of the mounted member which is to be joined to the mounting member, comprises: a first curved surface bulged toward the mounting member with a first radius of curvature, the first curved surface being disposed at a distal end position which first comes into contact with the mounting member when the mounted member is pressed against the mounting member; and a second curved surface having a second radius of curvature larger than the first radius of curvature and linking up with the first curved surface.

According to the construction described above, the sliding speed and volume of a plastic flow substance generated between the mounted member and the mounting member can be increased to thereby obtain a sufficient joining strength by virtue of good diffusion joining. In other words, the sliding speed of the plastic flow substance relative to a stroke can be increased further by the portion of the mounted member which is joined to the mounting member when the external surface configuration thereof prior to joining is formed into a curved surface than when formed into a flat surface. In addition, since the curved surface of the portion of the mounted member which first comes into contact with the mounting member is formed such that the radius of curvature thereof becomes relatively small, the volume of the plastic flow substance can be increased which is generated when the curved surface at the distal end sinks into the mounting member, and additionally since the portions linking up with the curved surface at the distal end are also formed into the curved surfaces, the sliding speed of the plastic flow substance can be increased to thereby aggressively discharge the plastic flow substance. Therefore, the mounted member can be diffusion joined to the mounting member well to thereby obtain a sufficient joining strength.

Further, according to the second aspect of the invention, there is provided a diffusion joining structure, comprising: a mounting member having a mounting face having an inner diameter which reduces toward one end of an axial direction thereof; a mounted member diffusion joined with the mounting member by pressing the mounted member toward the mounting member in a state that the mounted member and the mounting member are heated, the mounted member prior to joining having: a confronting end face located at one end in the axial direction and confronting the mounting face in at least an outer circumferential portion thereof; an external side face having a circular cross-section; and a linking portion disposed between the confronting face and the external side face, the linking portion being first brought into contact with the mounting face, wherein the linking portion is formed into a curved face bulged toward the mounting member side, the portions of the confronting end face and the external side face which are to be joined to the mounting member are formed into curved faces each having a radius of curvature larger than that of the linking portion, and an annular recessed portion is formed radially inwardly of the portion of the confronting end face which is to be joined to the mounting member, for receiving a plastic flow substance discharged from a joining interface between the mounting face and the confronting end face.

According to the construction described in the second aspect of the invention, the sliding speed and volume of the plastic flow substance generated between the mounted member and the mounting member are increased so as to obtain the sufficient joining strength through the good diffusion joining. Namely, since the sliding speed of the plastic flow substance relative to a stroke can be increased further by the portion of the mounted member which is joined to the mounting member when it has a curved external face in a state prior to joining than when having a flat one and since the linking portion adapted to first be brought into contact with the mounting face of the mounting member when the mounted member is pressed to the mounting member is formed into a curved face having a relatively small radius of curvature, the volume of the plastic flow substance generated when the linking portion sinks into the mounting member can be increased. In addition, since the portions of the confronting end face and the external side face that are to be joined to the mounting member are formed into curved faces each having a radius of curvature larger than that of the linking portion, the sliding speed of the plastic flow substance can be increased so that the plastic flow substance is aggressively discharged. Moreover, since the annular recessed portion is formed radially inwardly of the portion of the confronting end face which is to be joined to the mounting member, the plastic flow substance discharged from between the confronting end face and the mounting face is allowed to escape into the annular recessed portion so formed to thereby suppress as low as possible the scattering of the pressed resistance value generated when the discharged plastic flow substance sinks into between the mounting face and the confronting end face, whereby the joining depth can be controlled with higher accuracy.

In addition, prior to mounting the mounted member to the mounting member, a recessed joining portion may be provided on the mounting face of the mounting member which is constituted by an annular bottom face confronting the outer circumferential portion of the confronting end face and an internal side face rising from an outer circumferential edge of the annular bottom face toward the mounted member so as to confront the external side face of the mounted member, and the annular bottom face and the internal side face may be formed in such a manner that when the mounted member is pressed to the mounting face, a first step in which the linking portion comes into contact with the bottom face, a second step in which the confronting end face sequentially comes into contact with the bottom face from radially the outside and a third step in which the external side face sequentially comes into contact with the internal side face from axially the inside so as to cause a pressed resistance value to rise are to take place sequentially in this order.

According to the construction described the above, in the first step, the resistance value is increased drastically as the plastic flow substance is generated when the linking portion sinks into the mounting member, and in the second step, the same resistance value is gradually increased when the confronting end face of the mounted member comes into contact with the bottom face of the joining recessed portion sequentially from radially the outside. Moreover, in the third step, on top of the linking portion and the confronting end face, the external side face of the mounted member also sinks into the internal side face of the joining recessed portion, and therefore the resistance value is caused to rise drastically. In other words, when the mounted member is pressed to the mounting member, the variation characteristics of the resistance value is made to differ at each step such that the resistance value is caused to rise largely in the final step of joining which is just prior to achieving a target joining depth, whereby a timing can be determined with accuracy when the mounted member is stopped from being pressed, thereby making it possible to improve the accuracy with which the joining depth is controlled.

BRIEF DESCRIPTION OF THE DRAWINGS

FIGS. 5A and 5B are diagrams explaining the sliding speed of a plastic flow substance;

FIG. 10 is a diagram showing a change in resistance value in the diffusion joining process.

DETAILED DESCRIPTION OF THE PREFERRED EMBODIMENTS

[First Embodiment]

A description will be given of a first embodiment of the invention with reference to FIGS. 1 to 5B.

Figure 1:
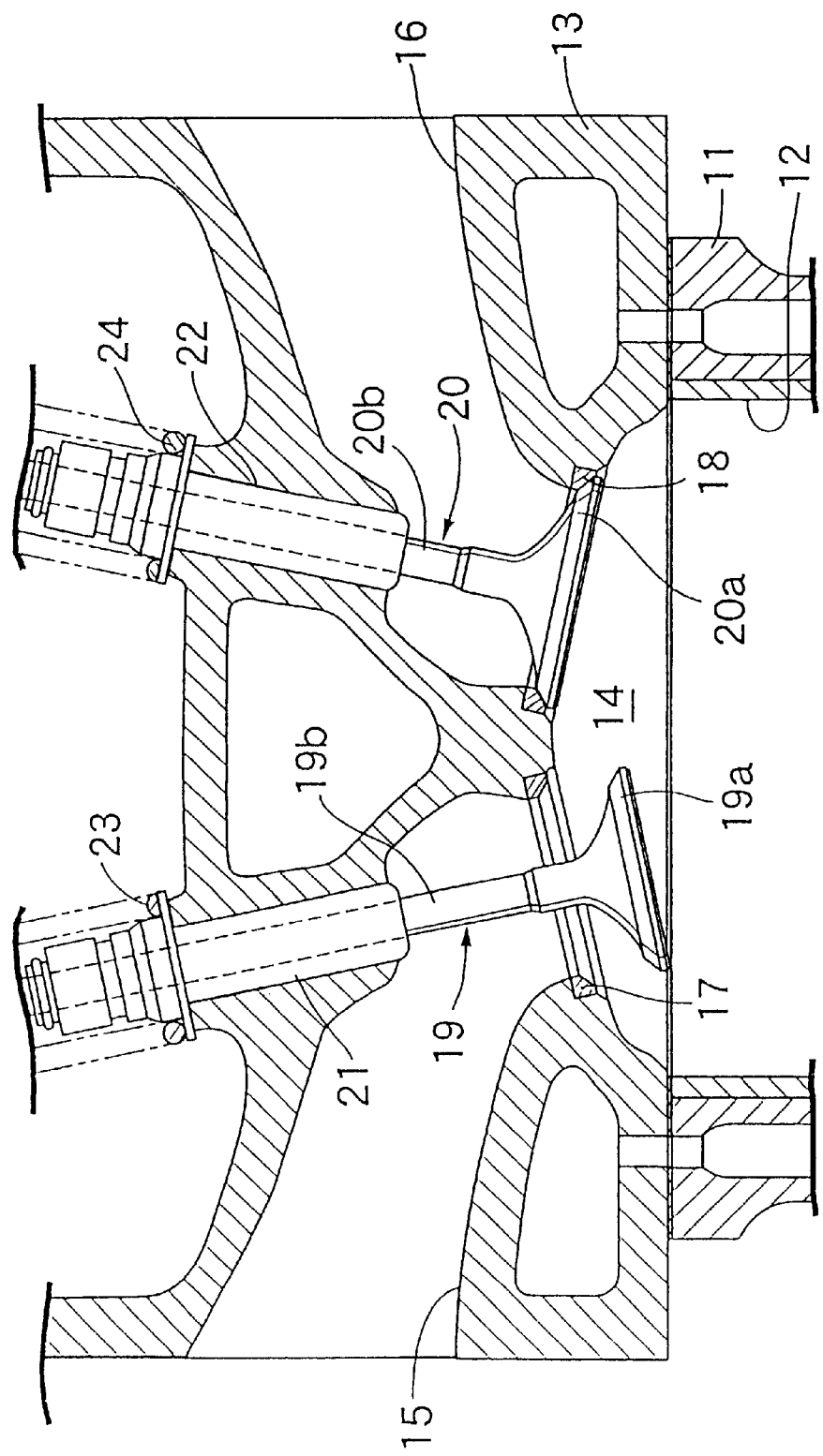
FIG. 1 is a vertical cross-sectional view showing a main part of a four-cycle engine according to a first embodiment of the invention.

First, in FIG. 1, a combustion chamber 14 is formed between a piston (not shown) slidably fitted in a cylinder 12 formed in a cylinder block 11 of a four-cycle engine and a cylinder head 13 as a mounting member that is coupled to the cylinder block 11. An intake port 15 and an exhaust port 16 are formed in the cylinder head 13, which communicate with the combustion chamber 14.

Valve seats 17, 18 are joined to the cylinder head 13, respectively, at ends of the intake port 15 and the exhaust port 16 which are open to the combustion chamber 14. Stem portions 19b, 20b of an intake valve 19 and an exhaust valve 20 provided with seat portions 19a, 20a, respectively, which are adapted to be seated on the valve seats 17, 18 are slidably fitted, respectively, in cylindrical valve guides 21, 22 formed in the cylinder head 13. Moreover, the respective stem portions 19b, 20b are adapted to protrude upwardly from the cylindrical valve guides 21, 22, respectively, and springs 23, 24 are provided between upper ends of the respective stem portions 19b, 20b and the cylinder head 13 in such a manner as to bias the intake valve 19 and the exhaust valve 20 upwardly or in a direction in which the seat portions 19a, 20a are seated on the valve seats 17, 18, respectively, to thereby close the intake port 15 and the exhaust port 16. In addition, a valve train (not shown) is coupled to the upper ends of the respective stem portions 19b, 20b for driving the intake valve 19 and the exhaust valve 20 so as to be opened and/or closed.

In general, the valve seats 17, 18 are assembled to the cylinder head 13 through press fitting, but in a recent engine lay-out, the intake valve 19 and the exhaust valve 20 are disposed in proximity of the valve seats, and therefore the conventional press fitting system provides little degree of freedom in modifying the lay-out on the periphery of a combustion chamber 14 with a view to enlarging the valve diameter or attaining a higher compression ratio. To cope with this, instead of the conventional press fitting system, in a case where the valve seats 17, 18 are directly joined to the cylinder head 13, the thickness of the valve seats 17, 18 can be reduced to thereby largely improve the degree of freedom in the lay-out on the periphery of the combustion chamber or improve the heat transfer performance through the valve seats 17, 18, whereby the temperatures of the intake and exhaust valves 19, 20, the valve seats 17, 18 and the combustion chamber 14 can be reduced, thereby making it possible to expect the engine performance to largely be improved. When this occurs, even if the valve seats 17, 18 are formed of a metal material which is different from that of the cylinder head 13, it is possible to obtain a sufficient joining strength by diffusion joining the valve seats to the cylinder head.

Figure 2:
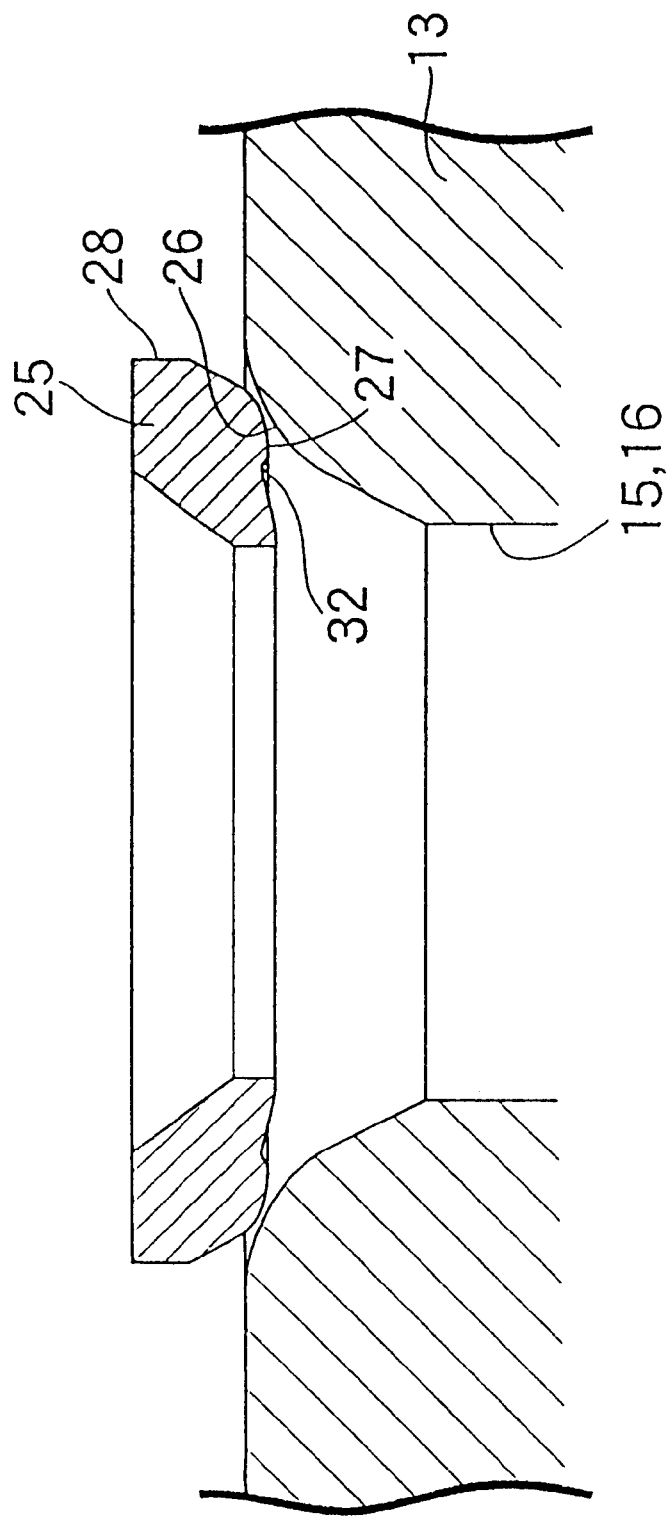
FIG. 2 is a vertical cross-sectional view showing a state just before a valve seat material is diffusion joined to a cylinder head according to the first embodiment of the invention.

In FIG. 2, a valve seat material 25 as the mounted member is diffusion joined to the cylinder head 13, and the valve seats 17, 18 are formed by machining the valve seat material 25 after the diffusion joining.

Thus, aluminum alloy casting is used for the cylinder head 13 which is a metal that is light in weight and which has a superior heat transfer characteristic, while for example, a sintered alloy of iron system having superior resistance to wear or a Cu—Be alloy having cooling and heat transfer characteristics is used for the valve seat material 25.

A mounting face 26 is formed at an end of each of the intake and exhaust ports 15, 16 in the cylinder head 13 which is open to the combustion chamber 14 in such a maimer that the diameter of the mounting face 26 is reduced gradually in a direction away from the combustion chamber 14 along the axial direction thereof. On the other hand, the valve seat material 25 is formed into a ring-like shape having at one of axial ends thereof a confronting end face 27 formed so as to confront the mounting face 26 at an outer circumferential portion thereof and an external side face 28 having a circular cross-section.

The valve seat material 25 is diffusion joined to the mounting face 26 when it is pressed against the mounting face 26 in a state in which the valve seat material 25 and the cylinder head 13 are heated. Thus, this heating state is obtained when a contacting area between the valve seat material 25 and the cylinder head 13 is heated with Joule heat by exciting the valve seat material 25 and the cylinder head 13 with a large current for a short period of time while the seat valve material 25 is kept in contact with the mounting face 26.

Figure 3:
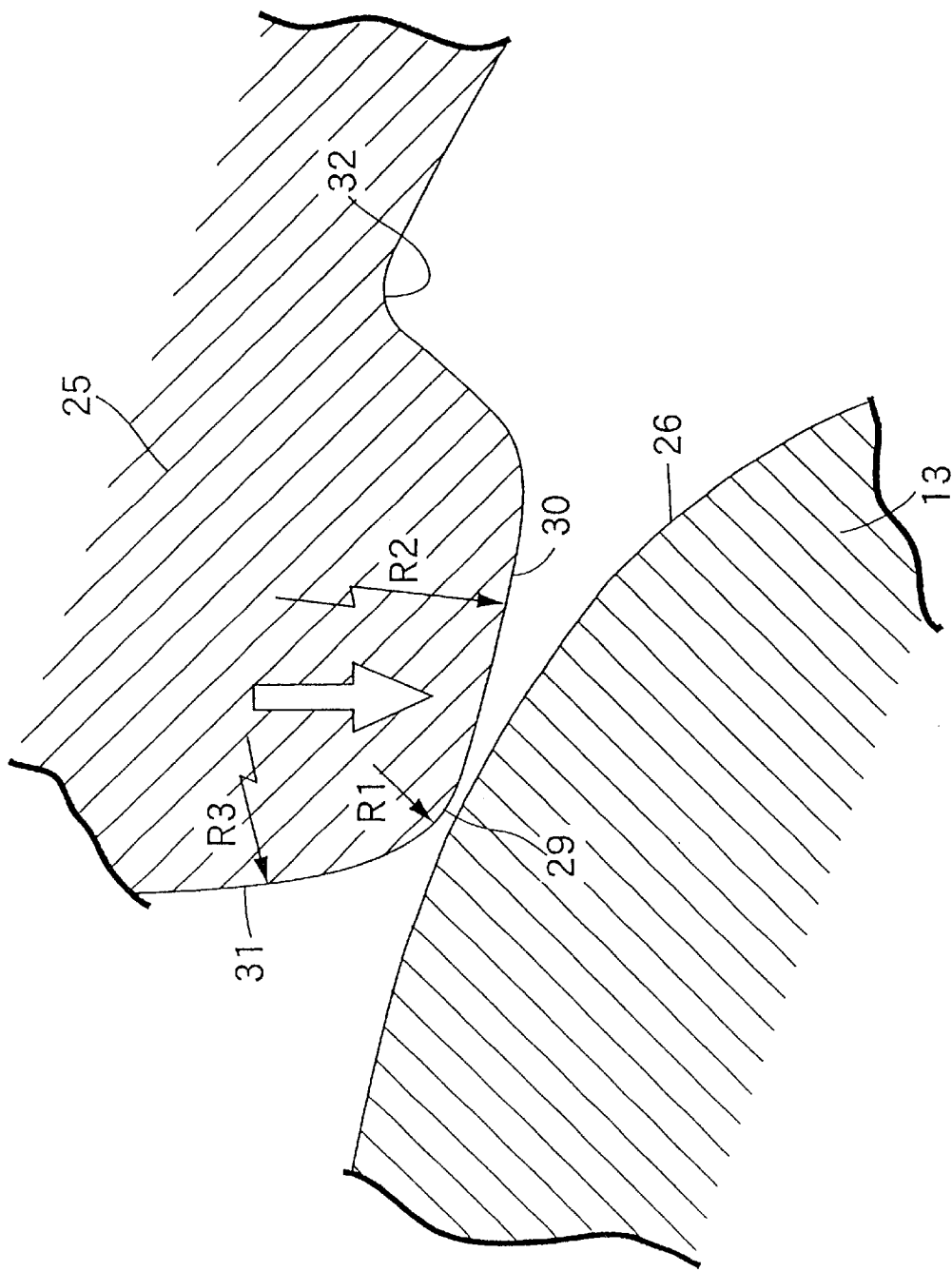
FIG. 3 is an enlarged view of a main part of FIG. 2.

In FIG. 3, the valve seat material 25 is formed such that a linking portion between the confronting end face 27 and the external side face 28 is first brought into contact with the cylinder head 13 when the valve seat material 25 is pressed toward the cylinder head 13 side, and a portion on an outer circumferential side of the confronting end face 27, a portion on a confronting end face 27 side of the external side face 28 and the linking portion are diffusion joined to the cylinder head 13.

Thus, the external surface configuration of the portion of the valve seat member 25 which is joined to the cylinder head 13 prior to joining comprises at a distal end position which first comes into contact with the cylinder head 13 when the valve seat material 25 is pressed against the cylinder head 13, a curved surface 29 bulged toward the cylinder head 13 with a radius of curvature R1, and other curved surfaces 30, 31 bulged toward the cylinder head 13 with radii of curvatures R2, R3 which are larger than that of the curved surface 29 and linking up with the curved surface 29. The curved surface 29 constitutes the linking portion between the confronting end face 27 and the external side face 28, the curved surface 30 constitutes the portion of the outer circumferential side of the confronting end face 27, and the curved surface 31 constitutes the portion on the confronting end face 27 side of the external side face 28.

Figure 4:
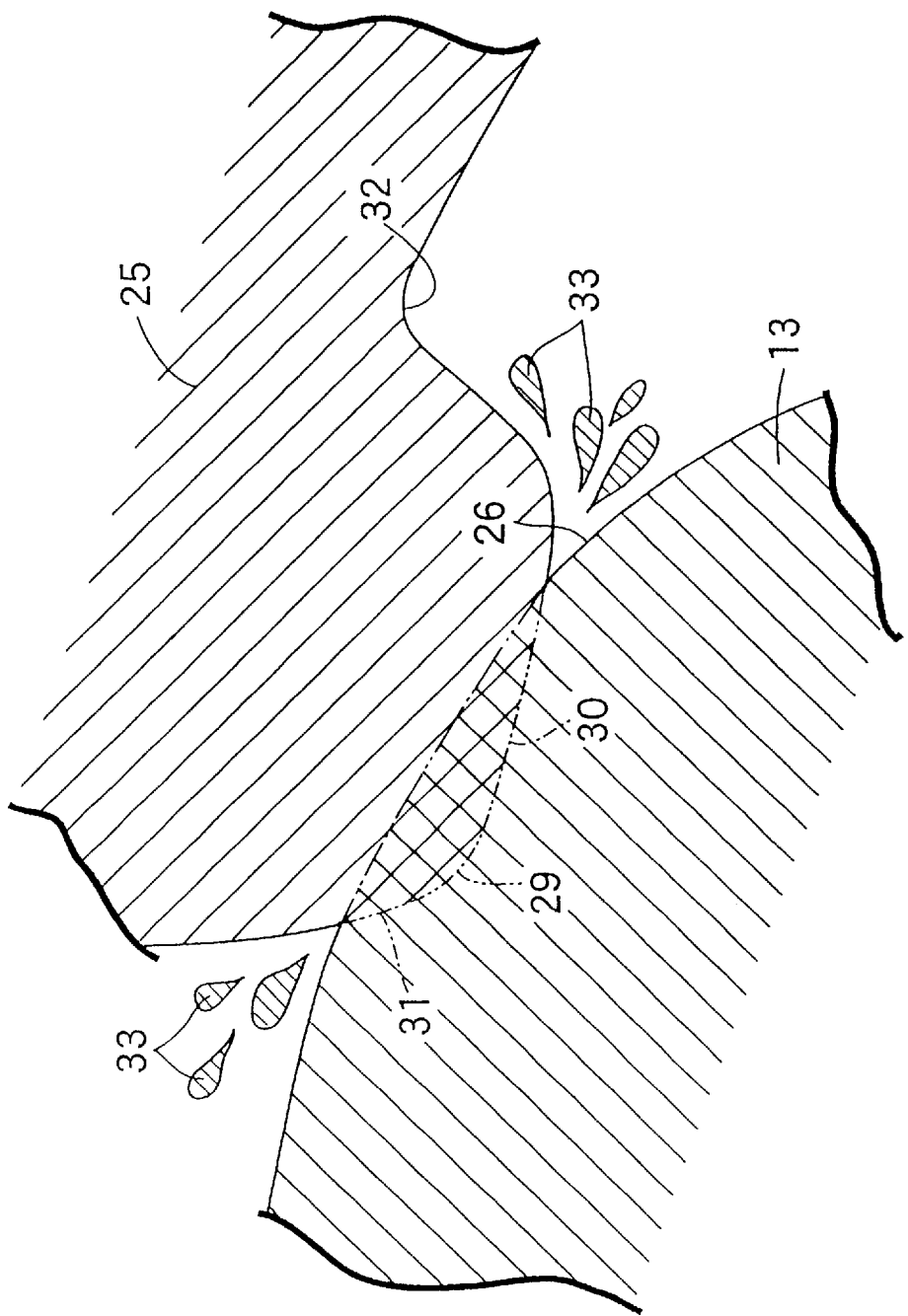
FIG. 4 is a cross-sectional view corresponding to FIG. 3, showing a diffusion joining in process.
Figure 6:
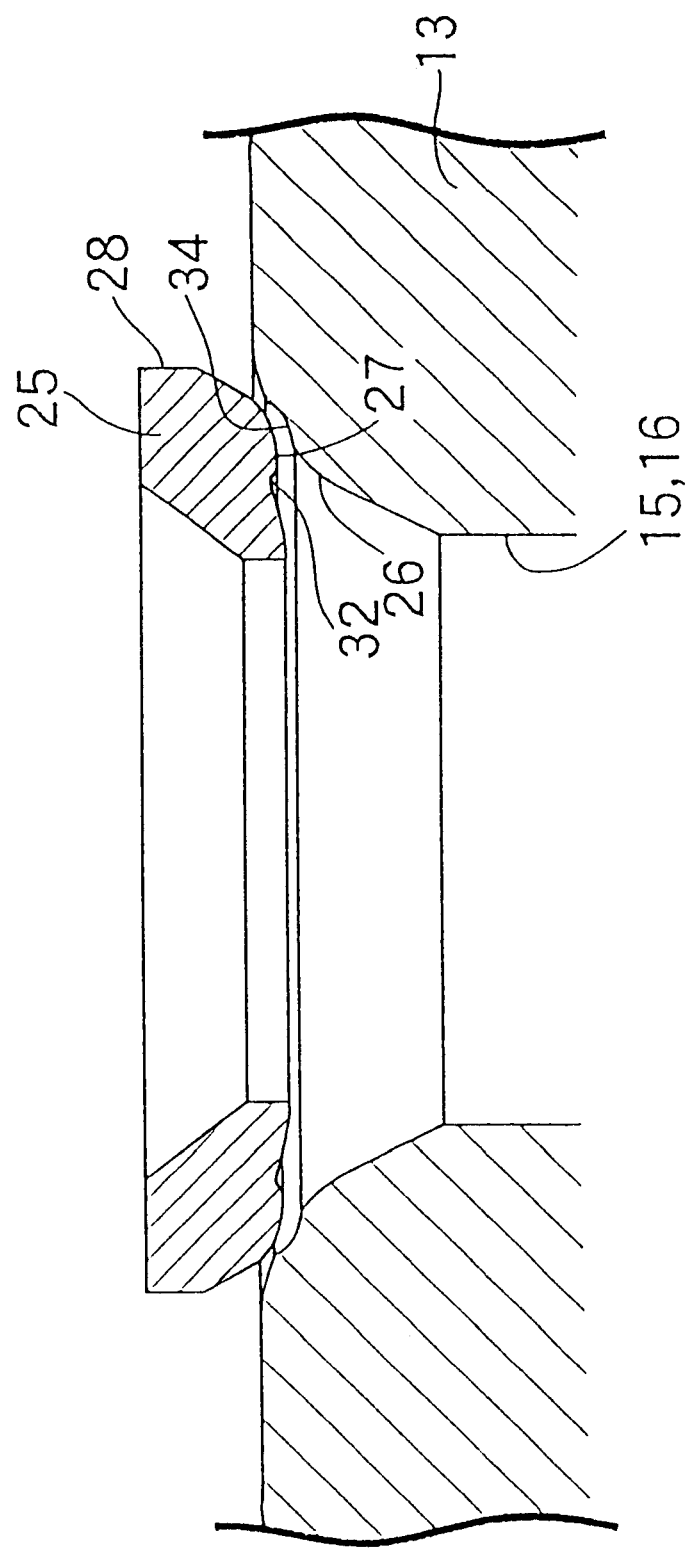
FIG. 6 is a vertical cross-sectional view showing a state before a valve seat material is diffusion joined to a cylinder head according to a second embodiment of the invention.

In addition, an annular recessed portion 32 is formed radially inwardly of the portion (curved surface 30) of the confronting end face 27 which is bonded to the cylinder head 13, and as shown in FIG. 4, a plastic flow substance 33 discharged from a joining interface between the mounting face 26 and the confronting end face 27 can be received in the recessed portion 32.

Next, the operation of this embodiment will be described. When the valve seat material 25 is pressed against the cylinder head 13 in a state in which the valve seat material 25 and the cylinder head 13 are heated, a sliding deformation is generated at a contacting area between the valve seat material 25 and the cylinder head 13, and oxidized films, foreign matters and intermetallic compounds on the surfaces of the valve seat material 25 and the cylinder head 13 are discharged from the joining interface between them as a plastic flow substance 33 as shown in FIG. 4, whereby micro irregularities and inter-atom voids in the joining interface are lost and a contact area is formed that is extremely clean and which has no atmosphere gas. Moreover, free electrons in the metals are activated through the contact between the clean surfaces in the heated state, and this causes diffusion within a particle and at an interface between particles, whereby the valve seat material 25 and the cylinder head 13 are diffusion joined to each other.

The sliding speed of the plastic flow substance 33 relative to the pressing stroke can be increased further by the portion of the valve seat material 25 which is joined to the cylinder head 13 when the external surface configuration of the portion is constituted by a curved face 29, 30, 31 than by a flat one. Namely, the distance L1 when the plastic flow substance 33 slides down along a curved surface shown in FIG. 5A becomes longer than the distance L2 when the substance slides down along a flat surface shown in FIG. 5B with the same pressing stroke S (L1>L2). Therefore, a faster sliding speed is provided by the portion of the valve seat material 25 which is joined to the cylinder head when the external surface configuration thereof in the state prior to joining is constituted by the curved surface 29, 30, 31 than by the flat one.

In addition, since the curved surface 29 which first comes into contact with the cylinder head 13 when the valve seat material 25 is pressed against the cylinder head 13 is formed so as to have a relatively small radius of curvature R1, the volume of the plastic flow substance 33 can be increased which is generated when the curved surface 29 of the valve seat material 25 sinks into the cylinder head 13. In addition, since the portions linking up with the curved surface 29 are also formed into curved surfaces, the sliding speed of the plastic flow substance 33 can be increased so as to aggressively discharge the same substance. Accordingly, the valve seat material 25 can be diffusion joined well to the cylinder head 13 to thereby obtain a sufficient joining strength.

Furthermore, the depth at which the valve seat material 25 is joined into the cylinder head 13 is determined by a balance between a sum of a resistance value corresponding to the volume of the plastic flow substance 33 when the valve seat material 25 sinks into the cylinder head 13 and a resistance value generated when the discharged plastic flow substance 33 sinks into between the mounting face 26 and the confronting end face 27 and a pressing force, and the resistance value generated when the aforesaid sinking of the valve seat material 25 into between the mounting face 26 and the confronting end face 27 takes place scatters very largely. Thus, with the scattering being kept as it is, it is difficult to control the joining depth with good accuracy.

The annular recessed portion 32 is formed radially inwardly of the portion of the confronting end face 27 which is joined to the cylinder head 13, and this recessed portion 32 can receive the plastic flow substance 33. Accordingly, the plastic flow substance 33 discharged inwardly from between the confronting end face 27 and the mounting face 26 is allowed to escape into the recessed portion 32, whereby the pressed resistance value can be suppressed as low as possible which is generated when the discharged plastic flow substance 33 sinks between the mounting face 26 and the confronting end face 27, thereby making it possible to control the joining depth with higher accuracy.

[Second Embodiment]

Figure 7:
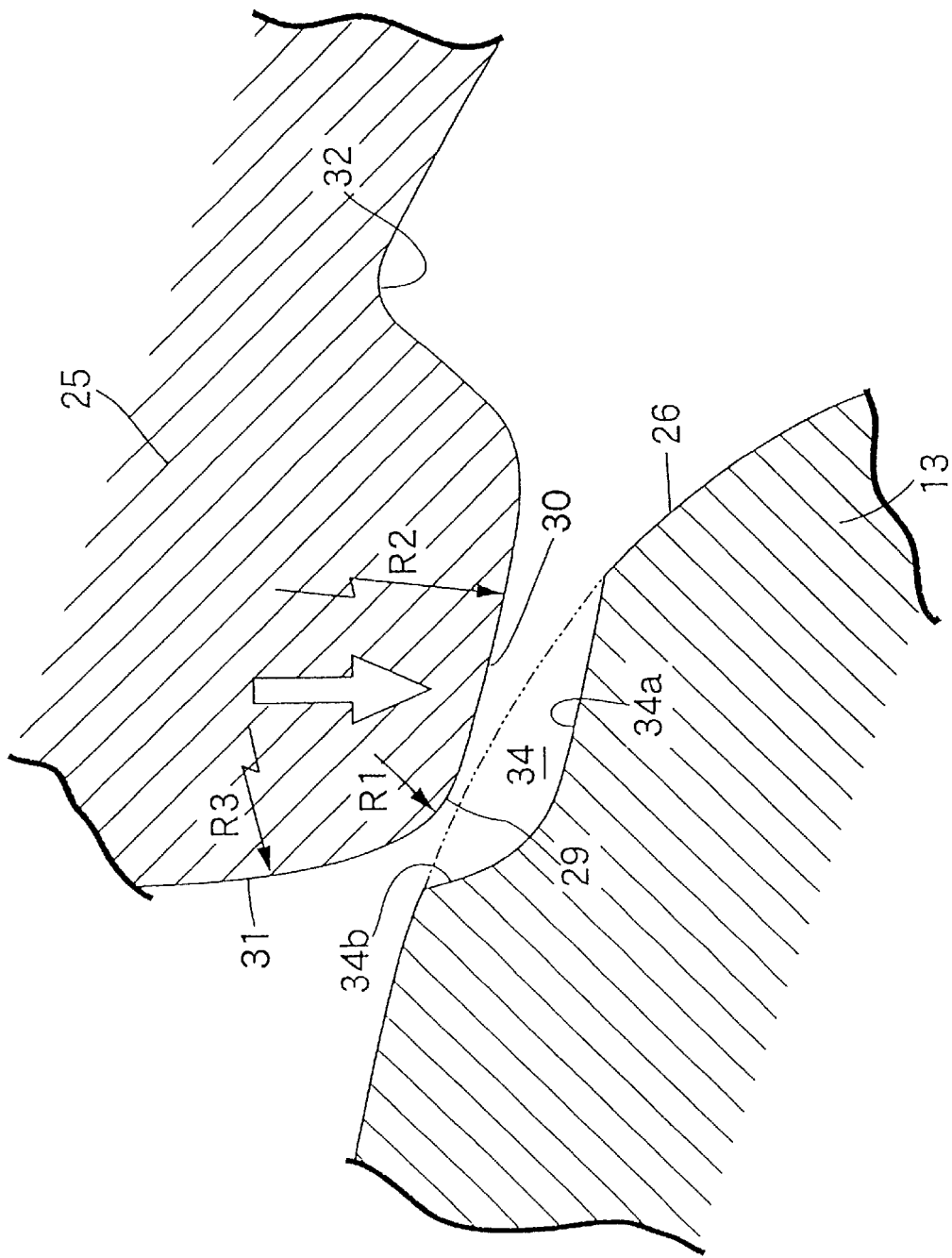
FIG. 7 is an enlarged view showing a main part of FIG. 6.
Figure 8:
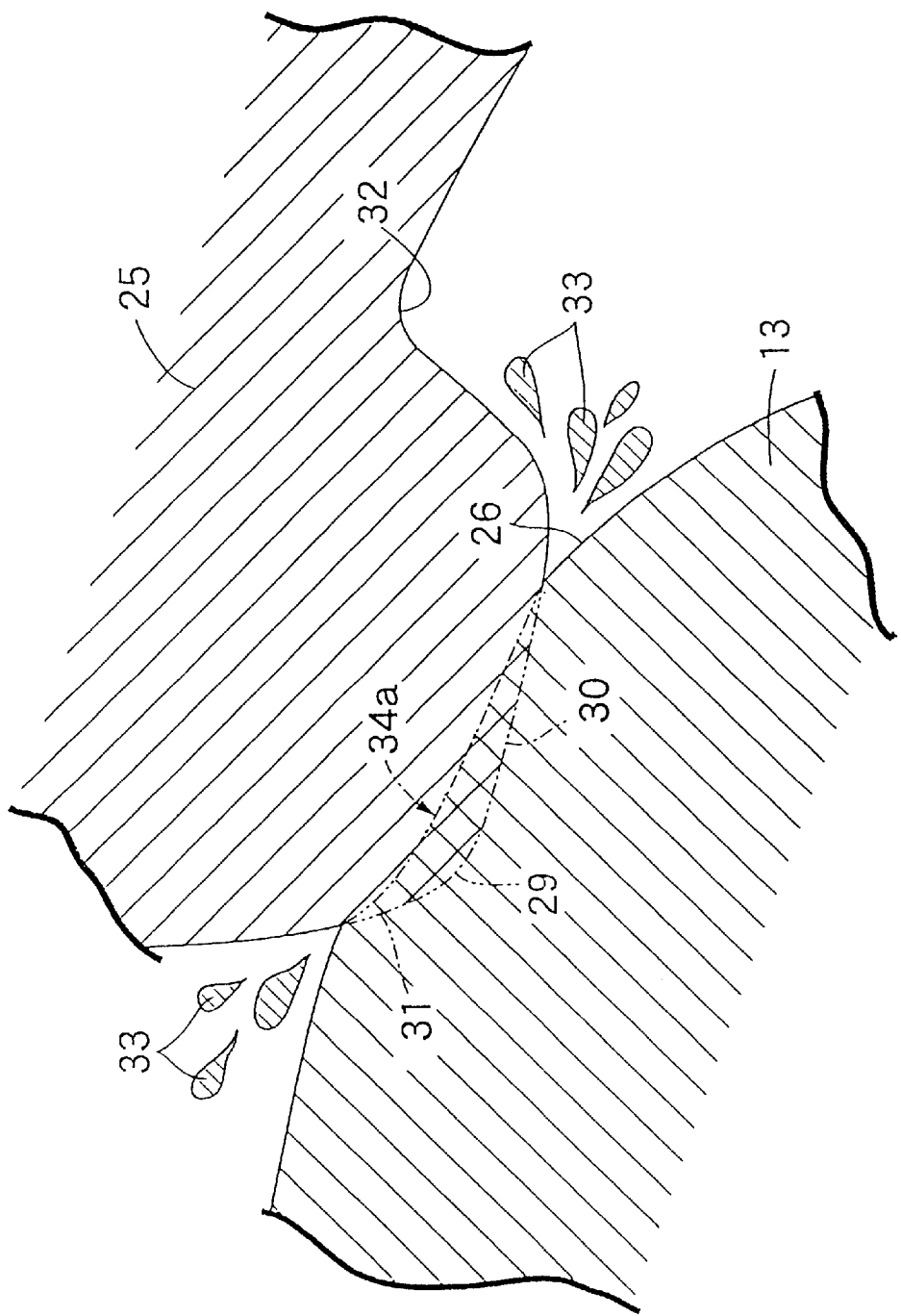
FIG. 8 is a cross-sectional view corresponding to FIG. 7, showing the completion of a diffusion joining process.

A description will be given of a second embodiment of the invention with reference to FIGS. 6–10. In the second embodiment, as shown in FIG. 7, prior to joining the valve seat material 25 to the cylinder head 13, formed in the mounting face 26 of the cylinder head 13 is a joining recessed portion 34 constituted by an annular bottom face 34a confronting the outer circumferential portion of the confronting end face 27 of the valve seat 25 and an internal side face 34b formed so as to rise from an outer circumferential edge of the bottom face 34 toward the valve seat material 25 so as to confront the external side face 28 of the valve seat material 25.

On the other hand, as in the first embodiment, the linking portion of the valve seat material 25 is formed in the curved surface 29 with the radius of curvature R1 I the state prior to the diffusion joining, the portion of the outer circumferential side of the confronting end face 27 is formed in the curved surface 30 with the radius of curvature R2 which is larger than that of the linking portion, and the portion on the confronting end face 27 side of the external side face 28 is formed in the curved surface 31 with the radius of curvature R3 which is larger than that of the linking portion.

Figure 9A:
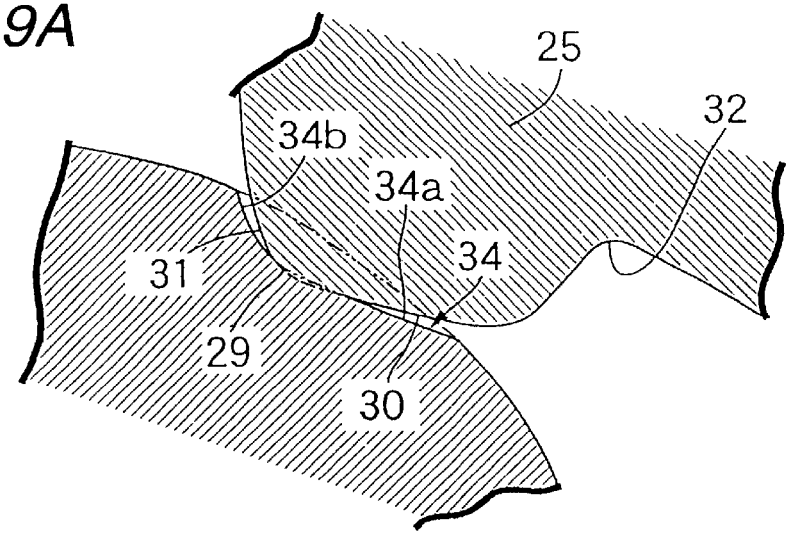
FIGS. 9A to 9C are cross-sectional views explaining the diffusion joining process in a sequential fashion.
Figure 9B:
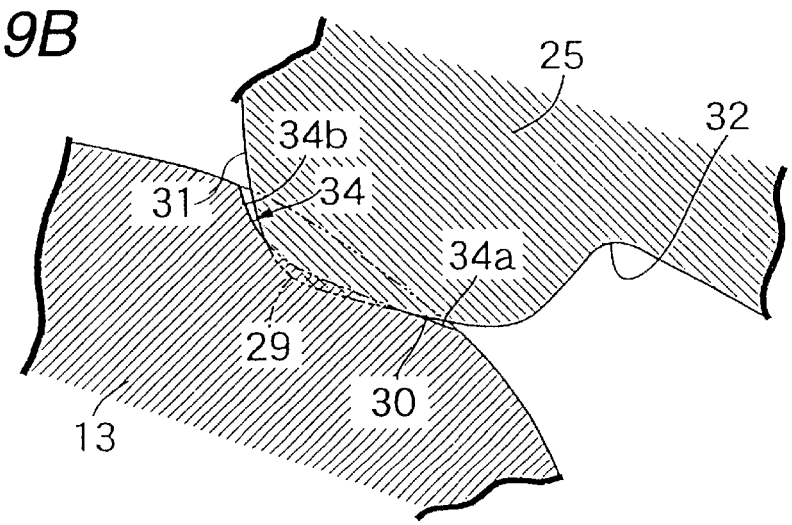
Figure 9C:
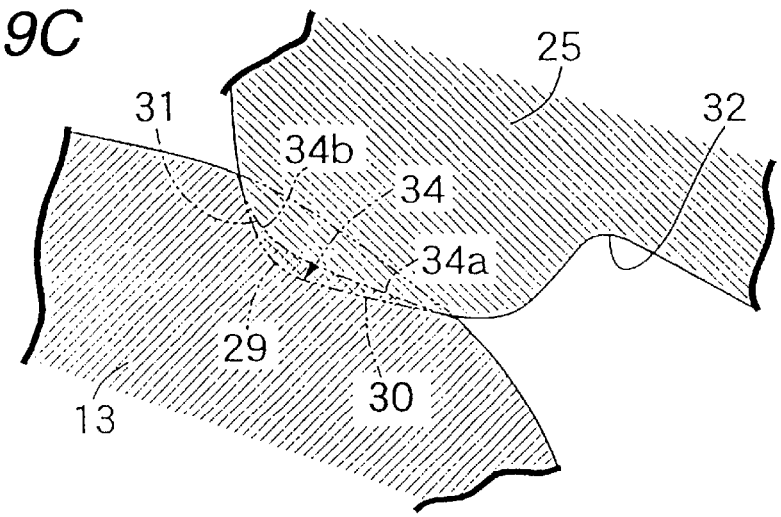

These bottom face 34a and the internal side face 34b are formed such that a first step in which the linking portion comes into contact with the outer circumferential portion of the bottom face 34a, as shown in FIG. 9A, a second step in which the confronting end face 27 comes into contact with the bottom face 34a sequentially from radially the outside, as shown in FIG. 9B, and a third step in which the external side face 28 comes into contact with the internal side face 34b sequentially from axially the inside to thereby cause a pressed resistance value to rise, as shown in FIG. 9C are to take place in this order.

Accordingly, the second embodiment of the invention has following effects in addition to that of the first embodiment. Prior to joining the valve seat material 25 to the cylinder head 13, formed in the mounting face 26 of the cylinder head 13 is the joining recessed portion 34 comprising the annular bottom face 34a and the internal side face 34b rising from the outer circumferential edge of the bottom face 34a toward the valve seat material 25. Further, the bottom face 34a and the internal side face 34b are formed such that the first step in which the linking portion of the valve seat material 25 comes into contact with the outer circumferential portion of the bottom face 34a when the valve seat material 25 is pressed against the mounting face 26, the second step in which the confronting end face 27 of the valve seat material 25 comes into contact with the bottom face 34a sequentially from radially the outside, and the third step in which the external side face 28 of the valve seat material 25 comes into contact with the internal side face 34b sequentially from axially the inside are to take place in that order. The joining recessed portion 34 constructed as described above can help determine the timing when the pressing is stopped with accuracy, whereby the accuracy with which the joining depth is controlled can improved.

In FIG. 10, in the first step, the resistance value drastically increases in response to the generation of the plastic flow substance triggered when the linking portion 29 of the valve seat material 25 sinks into the cylinder head 13, in the second step, the same resistance value gradually increases when the confronting end face 27 of the valve seat material 25 sequentially comes into contact with the bottom face 34a of the joining recessed portion 34 from radially the outside, and in the third step, since in addition to the linking portion and the confronting end face 27, the external side of the valve seat material 28 also sinks into the internal side face 34b of the joining recessed portion 34, the resistance value rises largely. In other words, when the valve seat material 25 is pressed against the cylinder head 13 with a certain pressing force, the variation characteristic of the resistance value is caused to change every step, and the certain pressing force with which the valve seat material 25 is pressed and the resistance value (a reaction force against the pressing) are caused to balance in the final third step in which the resistance value rises largely, whereby a target joining depth can be obtained with accuracy, thereby making it possible to improve the accuracy with which the joining depth is controlled.

Thus, while several embodiments of the invention have been described, the invention is not limited thereto, and various modifications in design may be made without departing from the scope of the respective aspects of the invention described in the claims.

For instance, the invention is not limited to the diffusion joining of the valve seat material 25 to the cylinder head 13, but may be widely applied to the diffusion joining of the mounted member to the mounting member.

As has been described above, according to the first aspect of the invention, the sliding speed and volume of the plastic flow substance generated between the mounted member and the mounting member are increased so as to obtain a sufficient joining strength by virtue of the good diffusion joining.

Moreover, the scattering of the pressed resistance value generated when the discharged plastic flow substance sinks between the mounting face and the confronting end face can be suppressed as low as possible, whereby the joining depth can be controlled with accuracy.

In addition, according to the second aspect of the invention, the resistance value is set so as to rise largely in the final stage in the pressing process of the mounted member to the mounting member which is just before the target joining depth is obtained, whereby the timing can be determined with accuracy when the pressing is stopped, thereby making it possible to improve the accuracy with which the joining depth is controlled.

What is claimed is:

1. A diffusion joining structure in which a mounted member is pressed against a mounting member in a state that said mounted member and said mounting member are heated,
    wherein an external surface configuration prior to joining of a portion of said mounted member which is to be joined to said mounting member, comprises:
        a first curved surface bulged toward said mounting member with a first radius of curvature, said first curved surface being disposed at a distal end position which first comes into contact with said mounting member when said mounted member is pressed against said mounting member; and
        a second curved surface having a second radius of curvature larger than said first radius of curvature and linking up with said first curved surface.

2. The diffusion joining structure according to claim 1, wherein said mounted member further comprises a recessed portion disposed adjacent to said portion of said mounted member which is to be joined to said mounting member, for receiving a plastic flow substance discharged from a joining interface between said mounting member and said mounted member.

3. The diffusion joining structure according to claim 1, wherein said mounted member is a valve seat material, and said mounting member is a cylinder head.

4. A diffusion joining structure, comprising:
    a mounting member having a mounting face having an inner diameter which reduces toward one end of an axial direction thereof;
    a mounted member diffusion joined with said mounting member by pressing said mounted member toward said mounting member in a state that said mounted member and said mounting member are heated, said mounted member prior to joining having:
- a confronting end face located at one end in the axial direction and confronting said mounting face in at least an outer circumferential portion thereof;
- an external side face having a circular cross-section; and
- a linking portion disposed between said confronting face and said external side face, said linking portion being first brought into contact with said mounting face, wherein said linking portion is formed into a curved face bulged toward said mounting member side, the portions of said confronting end face and said external side face which are to be joined to said mounting member are formed into curved faces each having a radius of curvature larger than that of said linking portion, and an annular recessed portion is formed radially inwardly of said portion of said confronting end face which is to be joined to said mounting member, for receiving a plastic flow substance discharged from a joining interface between said mounting face and said confronting end face.

5. The diffusion joining structure according to claim 4, wherein prior to joining said mounted member to said mounting member, said mounting face includes a recessed joining portion defined by an annular bottom face confronting the outer circumferential portion of said confronting end face and an internal side face rising from an outer circumferential edge of said annular bottom face toward said mounted member and confronting said external side face of said mounted member.

6. The diffusion joining structure according to claim 5, wherein said annular bottom face and said internal side face are formed in such a manner that when said mounted member is pressed to said mounting face, a first step in which said linking portion comes into contact with said bottom face, a second step in which said confronting end face sequentially comes into contact with said bottom face from radially the outside and a third step in which said external side face sequentially comes into contact with said internal side face from axially the inside so as to cause a pressed resistance value to rise are to take place sequentially in this order.

7. The diffusion joining structure according to claim 4, wherein said recessed joining portion is formed in such a manner that when said mounted member is pressed to said mounting face, a first step in which said linking portion comes into contact with said bottom face, a second step in which said confronting end face sequentially comes into contact with said bottom face from radially the outside and a third step in which said external side face sequentially comes into contact with said internal side face from axially the inside so as to cause a pressed resistance value to rise are to take place sequentially in this order.

8. The diffusion joining structure according to claim 4, wherein said mounted member is a valve seat material, and said mounting member is a cylinder head.

* * * * *